(12) United States Patent
Karaoguz et al.

(10) Patent No.: US 8,340,503 B2
(45) Date of Patent: Dec. 25, 2012

(54) OVERLAY TO AUGMENT QUALITY OF CURRENTLY PLAYING MEDIA

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 539 days.

(21) Appl. No.: 12/696,466

(22) Filed: Jan. 29, 2010

(65) Prior Publication Data
US 2010/0290756 A1 Nov. 18, 2010

Related U.S. Application Data

(60) Provisional application No. 61/177,763, filed on May 13, 2009.

(51) Int. Cl.
*H11B 27/00* (2006.01)
(52) U.S. Cl. ...................................... 386/278
(58) Field of Classification Search .................. None
See application file for complete search history.

(56) References Cited

U.S. PATENT DOCUMENTS

2007/0003223 A1* 1/2007 Armstrong et al. ............. 386/95

* cited by examiner

*Primary Examiner* — William C Vaughn, Jr.
*Assistant Examiner* — Daniel Tekle
(74) *Attorney, Agent, or Firm* — Garlick & Markison; Shayne X. Short

(57) ABSTRACT

Overlay to augment quality of currently playing media. The overlay operates to enhance the quality format of media so that it is output in a different quality format. As one example, when playing media content encoded in accordance with a standard definition television (SDTV) quality format, an appropriate overlay would operate to upgrade the quality format thereof to enhanced definition television (EDTV) quality format, high definition television (HDTV) quality format (or some other quality format). An appropriate overlay may also operate in accordance with audio content (e.g., upgrading a quality format of the audio content). With the advent of Blu-Ray discs (and other higher quality format discs), many individuals presently have libraries of media that are encoded with legacy/previous quality formats. An appropriate overlay that operates in conjunction with media encoded with a legacy/previous quality format allows the same content to be enjoyed in accordance with a newer/improved quality format.

26 Claims, 11 Drawing Sheets

OVERLAY TO AUGMENT QUALITY OF CURRENTLY PLAYING MEDIA

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent application which is hereby incorporated herein by reference in its entirety and made part of the present U.S. Utility Patent Application for all purposes:

U.S. Provisional Application Ser. No. 61/177,763, entitled "Overlay to augment quality of currently playing media," filed May 13, 2009.

BACKGROUND OF THE INVENTION

1. Technical Field of the Invention

The invention relates generally to devices operable to output media; and, more particularly, it relates to modifying a quality format of such media before or during it is output.

2. Description of Related Art

The amount of media available for user consumption and enjoyment continues to grow a staggering rate. Many individuals have personal libraries of various types of media (e.g., CDs, DVDs, etc.). As various means of encoding and formatting such media continues to improve, and as various means of outputting such media (e.g., audio devices, televisions, etc.) continue to improve, there is a continuous desire and/or need from users to experience such media in a better quality format if not the latest/best quality format possible.

Particularly with respect to owned media (such as CD, DVDs, etc.) there is no means by which a user can upgrade or update his/her media library without making the significant investment to replace various the media with newly formatted/encoded media having a higher quality format. Many users are unwilling to make such a capital expense to replace various media within their collection, and will oftentimes only purchase new media (i.e., new to their collection) that has an improved quality format. Most users will not replace media they already own with media having the same content but presented in an improved quality format.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

A novel means is presented by which an overlay operates in conjunction with media to modify a quality format of the media before or during its being output. Considering one example, many users have libraries composed largely of media encoded and formatted with prior/legacy quality format standards (e.g., DVDs not encoded in accordance with a newer/better quality format such as Blu-Ray, etc.). It can be quite costly for a user to upgrade part or all of a media library to enjoy such media in an upgraded quality format (e.g., Blu-Ray or some other enhanced/improved quality format). Many users are unwilling to replace each and every media within their library with the same or similar media that is encoded and/or formatted in accordance with the most recently available (or a more recently available/better) quality format. By employing an overlay that is operative to work in conjunction with the media encoded in accordance with a prior/legacy quality format, the user is able to enjoy the media is a better quality format. Employing an overlay that operates in conjunction with a media that is encoded and/or formatted in accordance with a prior/legacy quality format can provide for significant cost savings and ease of use. Particularly when such an overlay is available and retrieved via a network connection of such a device, then any inconvenience to a user is quite minimal.

In some instances, the overlay is operative not only to augment the quality format of the media (while persevering essentially the same content thereof), but the overlay may also modify the content of the media as well. As an example, when a user plays audio media by a particular contributing artist, then the overlay may operate to replace such audio media with an extended play version of the same song or replace such audio media with a video clip of the contributing artist performing the song in concert, etc. Depending on the particular embodiment being implemented and/or user-selected operational parameters employed in a given embodiment, any one of various types of overlays may be identified and any one of various types of operations may be effectuated thereby (i.e., in accordance with the particular overlay being used).

There are a variety of types of devices that are operative to perform modification of a quality format of media before or during it is output by using an overlay. Some examples of such devices are described below.

Figure 1A:
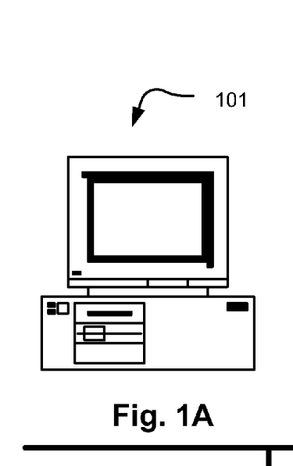
FIG. 1A illustrates an embodiment of a computer.

FIG. 1A illustrates an embodiment of a computer 101. The computer 101 can be a desktop computer, or an enterprise storage devices such a server, of a host computer that is attached to a storage array such as a redundant array of independent disks (RAID) array, storage router, edge router, storage switch and/or storage director. A user is able to view still digital images or video (e.g., a sequence of digital images) using the computer 101. Oftentimes, various image viewing capabilities and/or media player capabilities are included on a computer 101 to allow a user to view such images (including video). Also, certain embodiments of such a computer 101 can include one or more audio output devices (e.g., speakers either coupled to the computer 101 or integrated within the computer 101) to allow the outputting of audio content as well.

Figure 1B:
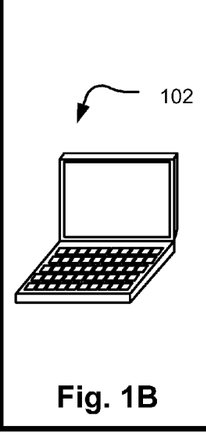
FIG. 1B illustrates an embodiment of a laptop computer.

FIG. 1B illustrates an embodiment of a laptop computer 102. Such a laptop computer 102 may be found and used in any of a wide variety of contexts. In recent years, with the ever-increasing processing capability and functionality found within laptop computers, they are being employed in many instances where previously higher-end and more capable desktop computers would be used. As with the computer 101, the laptop computer 102 may include various image viewing capabilities and/or media player capabilities to allow a user to view such images (including video). The laptop computer 102 may also include or be coupled to one or more audio output devices (e.g., speakers).

Figure 1C:
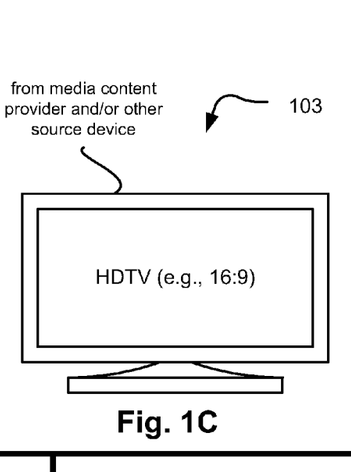
FIG. 1C illustrates an embodiment of a high definition (HD) television.

FIG. 1C illustrates an embodiment of a high definition (HD) television 103. Many HD televisions 103 include an integrated tuner to allow the receipt, processing, and decoding of media content (e.g., television broadcast signals) thereon. Alternatively, sometimes an HD television 103 receives media content from another source such as a digital video disc (DVD) player, set top box (STB) that receives, processes, and decodes a cable and/or satellite television broadcast signal (or alternatively, an over the air broadcast signal). Regardless of the particular implementation, the HD television 103 may be implemented to perform media processing as described herein. Generally speaking, an HD television 103 has capability to display HD media content and oftentimes is implemented having a 16:9 widescreen aspect ratio. Clearly, other aspect ratios other than merely 16:9 may be implemented within such an HD television 103. Such an HD television 103 typically will include integrated speakers. Also, such a HD television 103 may be implemented cooperatively with an external sound system that outputs audio content.

Figure 1D:
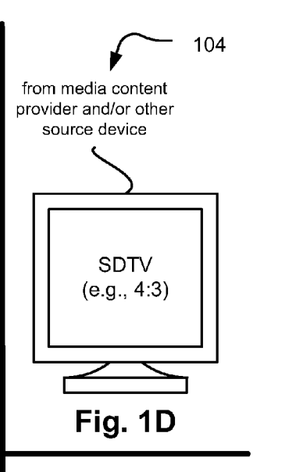
FIG. 1D illustrates an embodiment of a standard definition (SD) television.

FIG. 1D illustrates an embodiment of a standard definition (SD) television 104. Of course, an SD television 104 is somewhat analogous to an HD television 103, with at least one difference being that the SD television 104 does not include capability to display HD media content, and an SD television 104 oftentimes is implemented having a 4:3 full screen aspect ratio. Nonetheless, even an SD television 104 may be implemented to perform media processing as described herein. As mentioned above with respect to another television type, such an SD television 104 typically will include integrated speakers. Also, such a SD television 104 may be implemented cooperatively with an external sound system that outputs audio content.

Figure 1E:
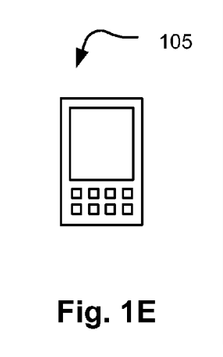
FIG. 1E illustrates an embodiment of a handheld media unit.

FIG. 1E illustrates an embodiment of a handheld media unit 105. A handheld media unit 105 may operate to provide general storage or storage of image/video content information such as joint photographic experts group (JPEG) files, tagged image file format (TIFF), bitmap, motion picture experts group (MPEG) files, Windows Media Architecture (WMA) files, other types of video content such as MPEG4 files, etc. for playback to a user, and/or any other type of information that may be stored in a digital format. Historically, such handheld media units were primarily employed for storage and playback of audio media; however, such a handheld media unit 105 may be employed for storage and playback of virtual any media (e.g., audio media, video media, photographic media, etc.). Moreover, such a handheld media unit 105 may also include other functionality such as integrated communication circuitry for wired and wireless communications. Such a handheld media unit 105 may be implemented to perform media processing as described herein.

Figure 1F:
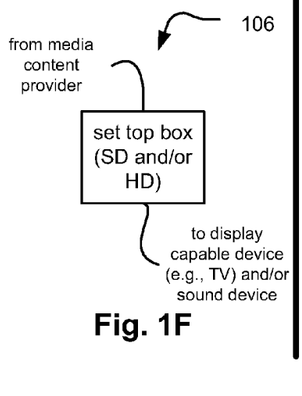
FIG. 1F illustrates an embodiment of a set top box (STB).

FIG. 1F illustrates an embodiment of a set top box (STB) 106. As mentioned above, sometimes a STB 106 may be implemented to receive, process, and decode a cable and/or satellite television broadcast signal to be provided to any appropriate display capable device such as SD television 104 and/or HD television 103. Such an STB 106 may operate independently or cooperatively with such a display capable device to perform media processing as described herein.

Figure 1G:
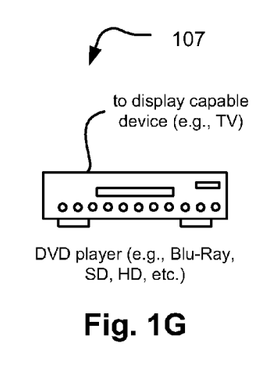
FIG. 1G illustrates an embodiment of a digital video disc (DVD) player.

FIG. 1G illustrates an embodiment of a digital video disc (DVD) player 107. Such a DVD player may be any one of a Blu-Ray DVD player, an HD capable DVD player, an SD capable DVD player, and an up-sampling capable DVD player (e.g., from SD to HD, etc.) without departing from the scope and spirit of the invention. The DVD player may provide a signal to any appropriate display capable device such as SD television 104 and/or HD television 103. The DVD player 105 may be implemented to perform media processing as described herein.

Figure 1H:
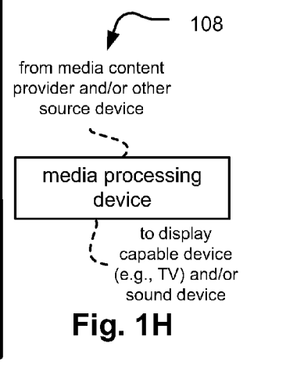
FIG. 1H illustrates an embodiment of a generic media processing device.

FIG. 1H illustrates an embodiment of a generic media processing device 108. Again, as mentioned above, these various devices described above do not include an exhaustive list of devices in which the media processing described herein may be effectuated, and it is noted that any generic digital media processing device 108 may be implemented to perform the media processing described herein without departing from the scope and spirit of the invention.

Figure 2:
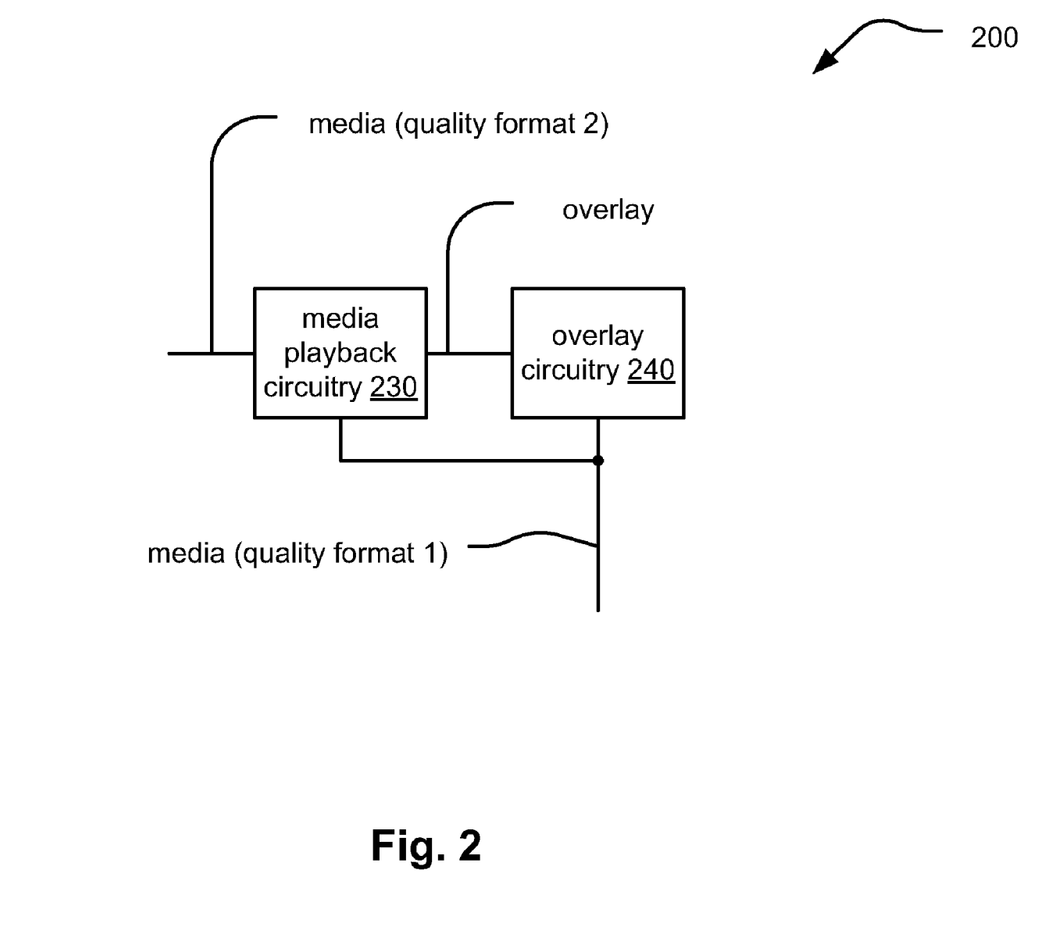
FIG. 2 illustrates an embodiment of an apparatus that is operative to employ an overlay to modify a quality format of media that is output thereby.

FIG. 2 illustrates an embodiment of an apparatus 200 that is operative to employ an overlay to modify a quality format of media that is output thereby. The apparatus 200 includes a media playback circuitry 230 and an overlay circuitry 240. The overlay circuitry 230 is coupled to the media playback circuitry 230, and the overlay circuitry 240 is operative to analyze media to identify a quality format of the media. This analysis may be performed by analyzing meta data associated with the media that indicates the quality format of the media. Alternatively, additional processing of the media may be performed to determine the quality format of the media. For example, a bit rate, resolution, frame rate, etc. at which media is encoded/formatted may be determined by analyzing the media.

Based on the quality format of the media, the overlay circuitry 240 is operative to identify an overlay that, when combined with the media during output via the media playback circuitry 230, is operative to modify the quality format of the media to a modified quality format. The media playback circuitry 230 then is operative to employ the overlay to output the media in accordance with the modified quality format.

As shown in this diagram, the media itself has a first quality format, and after being processed appropriately by the media playback circuitry 230 using the overlay, the media is then output from the media playback circuitry 230 in accordance with a second quality format. Generally, the second quality format is a relatively higher quality format than the first quality format. The media itself may be of any of a variety of formats including any one of audio media, video media, or image media.

In one embodiment, the overlay is operative to maintain the content of the media while modified the quality format of it to provide for an improved user experience when enjoying the media. In other embodiments, the actual content of the media may itself be modified or replaced to provide for an improved user experience when enjoying the media. For example, the original media may be audio media, yet the modified media output from the media playback circuitry 230 may be video media (e.g., the overlay being operative to replace audio media of a song with a video clip of a performer playing the same song in concert). Alternatively, the original media may be audio media such as a song in a radio marketed/shorter version, yet the modified media output from the media playback circuitry 230 may be an extended play version of the same song.

Figure 3:
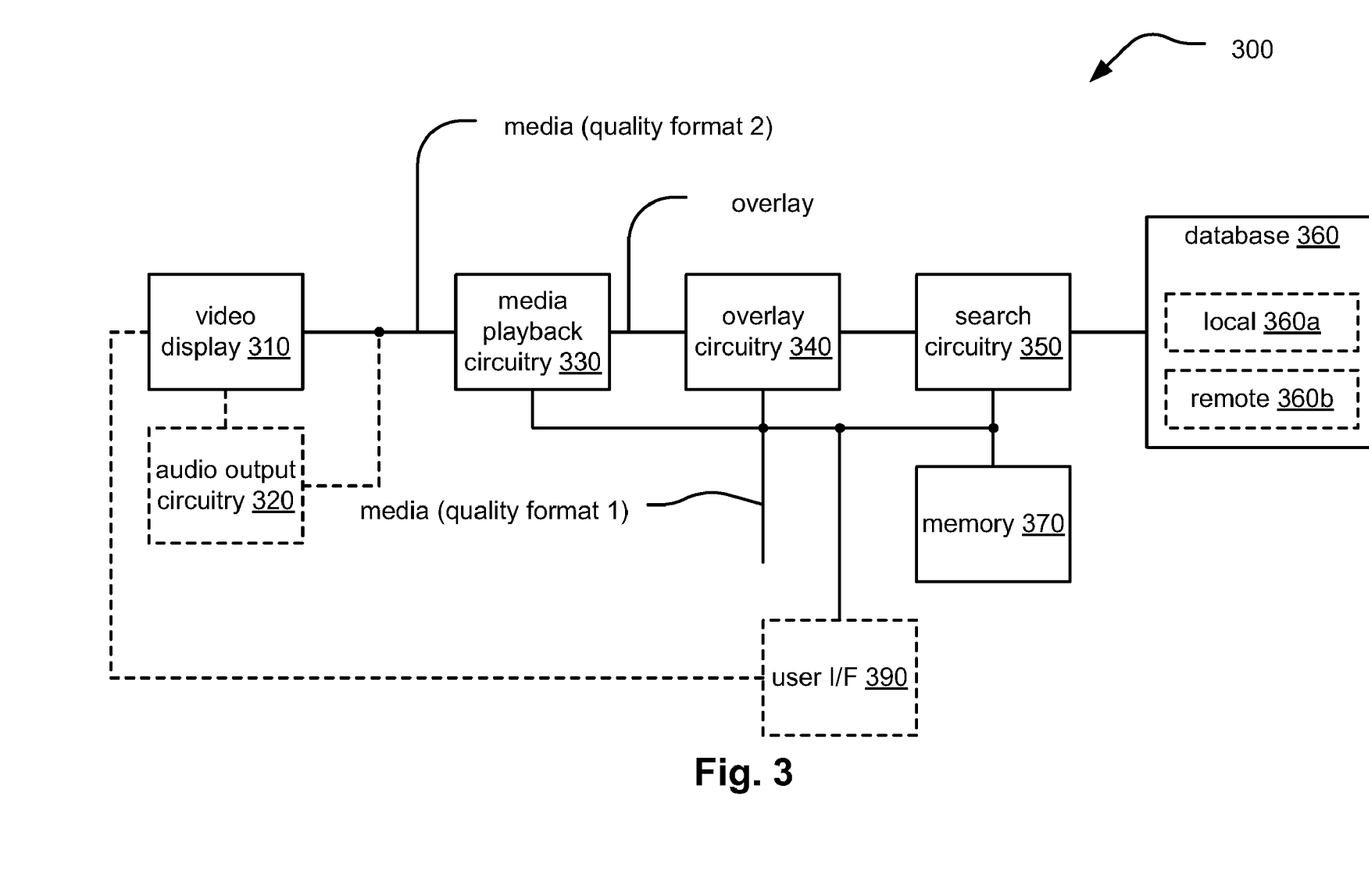
FIGS. 3 and 4 illustrate alternative embodiments of an apparatus that is operative to employ an overlay to modify a quality format of media that is output thereby.
Figure 4:
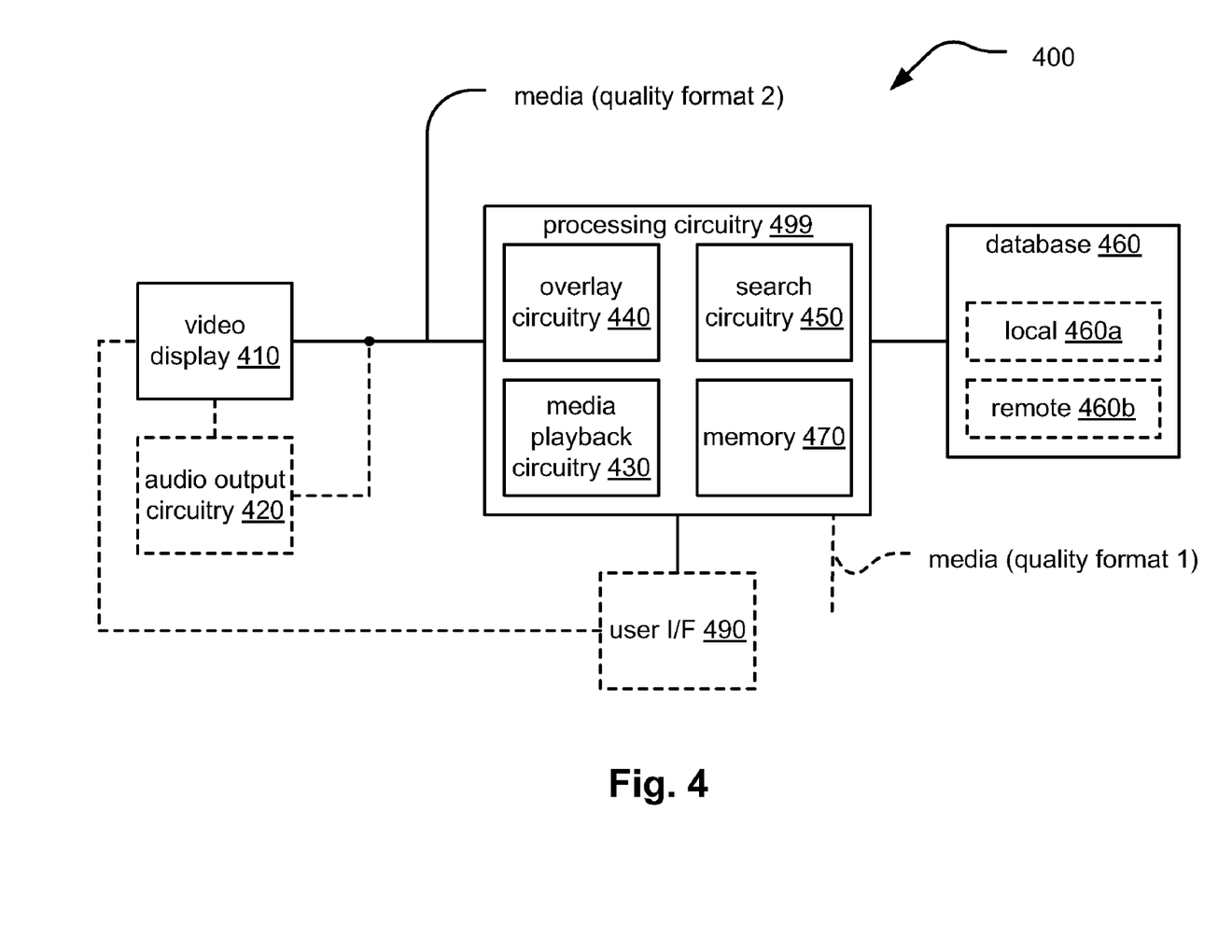

FIGS. 3 and 4 illustrate alternative embodiments of an apparatus that is operative to employ an overlay to modify a quality format of media that is output thereby.

Referring to apparatus 300 of FIG. 3, the apparatus 300 includes a media playback circuitry 330, an overlay circuitry 340, a search circuitry 350, and a memory circuitry 370.

The media playback circuitry 330 is coupled to a video display 310 that may include embedded or an integrated audio output circuitry or which may be coupled to an external audio output circuitry 320. A user interface 390 may also be implemented to receive information from and/or provide information to a user of the apparatus 300.

The overlay circuitry 340 is coupled to the media playback circuitry 330, and the overlay circuitry 340 is operative to analyze media to identify a quality format of the media. In some embodiments, a user interface 390, coupled to the overlay circuitry 340, is operative to receive user information corresponding to a modified quality format (e.g., a user-selected or desired quality format).

Based on the identified quality format and the user information corresponding to the modified quality format, the overlay circuitry 340 is operative to identify an overlay that, when combined with the media during output via the media playback circuitry, is operative to modify the quality format of the media to the modified quality format. The media playback circuitry 330 then employs the overlay to output the media in accordance with the modified quality format. In most embodiments, the modified quality format is relatively higher quality than the quality format.

In this embodiment, the search circuitry 350 accesses a database 360, which could be a local database 360a or a remote database 360b or a number of different local and/or remote databases, to identify an overlay that, when combined with the media during output via the media playback circuitry 330, is operative to modify the quality format of the media to a modified quality format.

The user interface 390 may be implemented to receive user information related to any one or more of the media, the first supplemental information, and the second supplemental information. Based on this user information, the meta data circuitry 380 is operative to modify any one of the meta data and/or other characteristics associated with the media and the modified meta data. In addition, the user interface 390 may operate as a bi-directional communication link to the user, in that, additional information may be provided to the user via the user interface 390 such as solicitations requesting for user provided input such as ratings, opinions, commentary, etc.

Referring to apparatus 400 of FIG. 4, this embodiment is somewhat analogous to the previous embodiment, but a processing circuitry 499 includes a media playback circuitry 430, an overlay circuitry 440, a search circuitry 450, and a memory circuitry 470 integrated therein.

The apparatus 400 also a video display 410, and the processing circuitry 430 is operative to access a database 460 (being one or both of local 460a or remote 460b in nature). In some embodiments, an external audio output circuitry 420 is also coupled to the processing circuitry 499 (e.g., to the media playback circuitry 430 implemented therein) and a user interface 490 may also be implemented to facilitate interaction with a user. The embodiment of this diagram shows just one possible alternative of integration of various modules or circuitries within an apparatus that is operative to employ an overlay to modify a quality format of media that is output thereby. Clearly, other variations or degrees of integration of various modules or circuitries may be employed in other embodiments.

FIGS. 5A, 5B, 5C, and 5D illustrate alternative embodiments of a media playback circuitry that operate using various types of media.

Figure 5A:
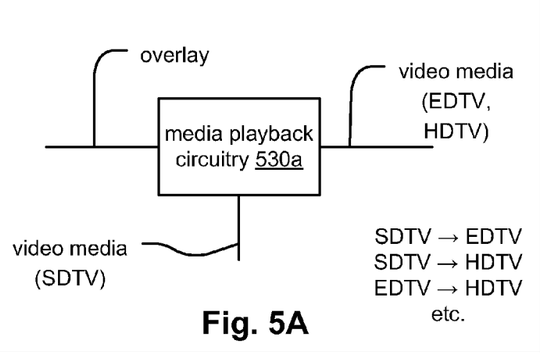
FIGS. 5A, 5B, 5C, and 5D illustrate alternative embodiments of a media playback circuitry that operate using various types of media.

Referring to the media playback circuitry 530a of FIG. 5A, video media having a standard definition television (SDTV) quality format is provided to the media playback circuitry 530a. By using an appropriately identified and selected overlay, the video media is output in a quality format that is relatively higher than the original format of the media. For example, the video media output from the media playback circuitry 530a (e.g., in enhanced definition television (EDTV) quality format or high definition television (HDTV) quality format).

Figure 5B:
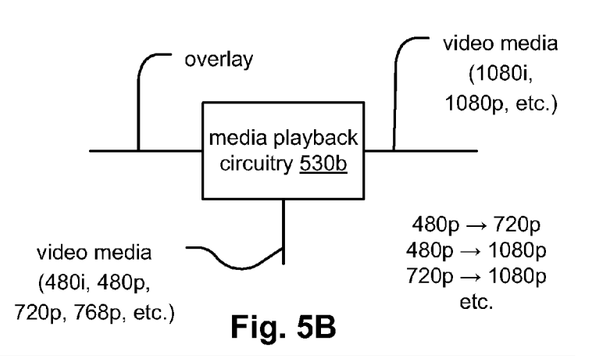

Referring to the media playback circuitry 530b of FIG. 5B, video media having a first resolution format is provided to the media playback circuitry 530b. By using an appropriately identified and selected overlay, the video media is output in a quality format that has a second resolution format (i.e., a relatively higher resolution format).

A variety of transformations of the quality format may be effectuated by using the overlay. For example the first resolution format may be 480p, and the second resolution format may be 720p. Alternatively, the first resolution format may be 480p, and the second resolution format may be 1080p, etc. A wide variety of improvements of the resolution format may be effectuated using the overlay.

Figure 5C:
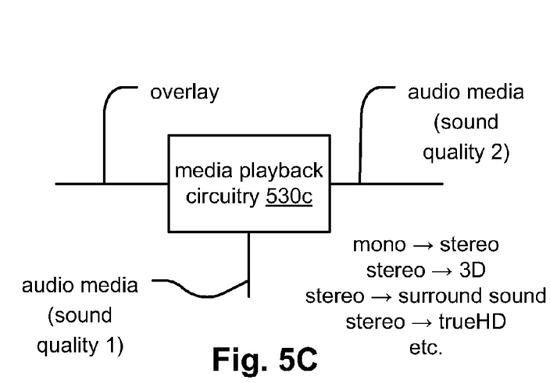

Referring to the media playback circuitry 530c of FIG. 5C, audio media having a first sound quality is provided to the media playback circuitry 530c. By using an appropriately identified and selected overlay, the audio media is output in a quality format that has a second sound quality (i.e., a relatively higher sound quality).

Figure 5D:
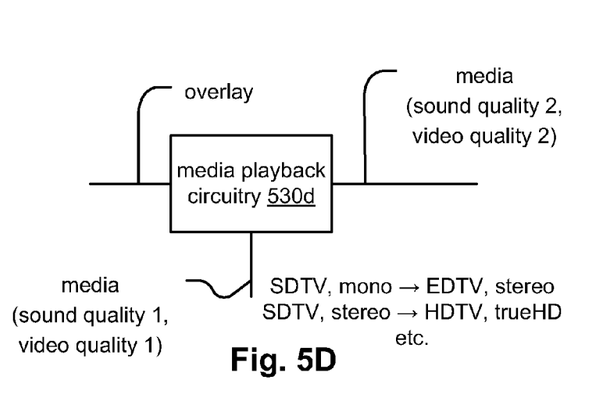

Referring to the media playback circuitry 530d of FIG. 5D, media composed of both audio content and video content and having a first sound quality format and a first video quality format is provided to the media playback circuitry 530d. By using an appropriately identified and selected overlay, the media is output in a quality format that has a second sound quality format and a second video quality format (i.e., a relatively higher sound quality format and a relatively higher video quality format).

Figure 6:
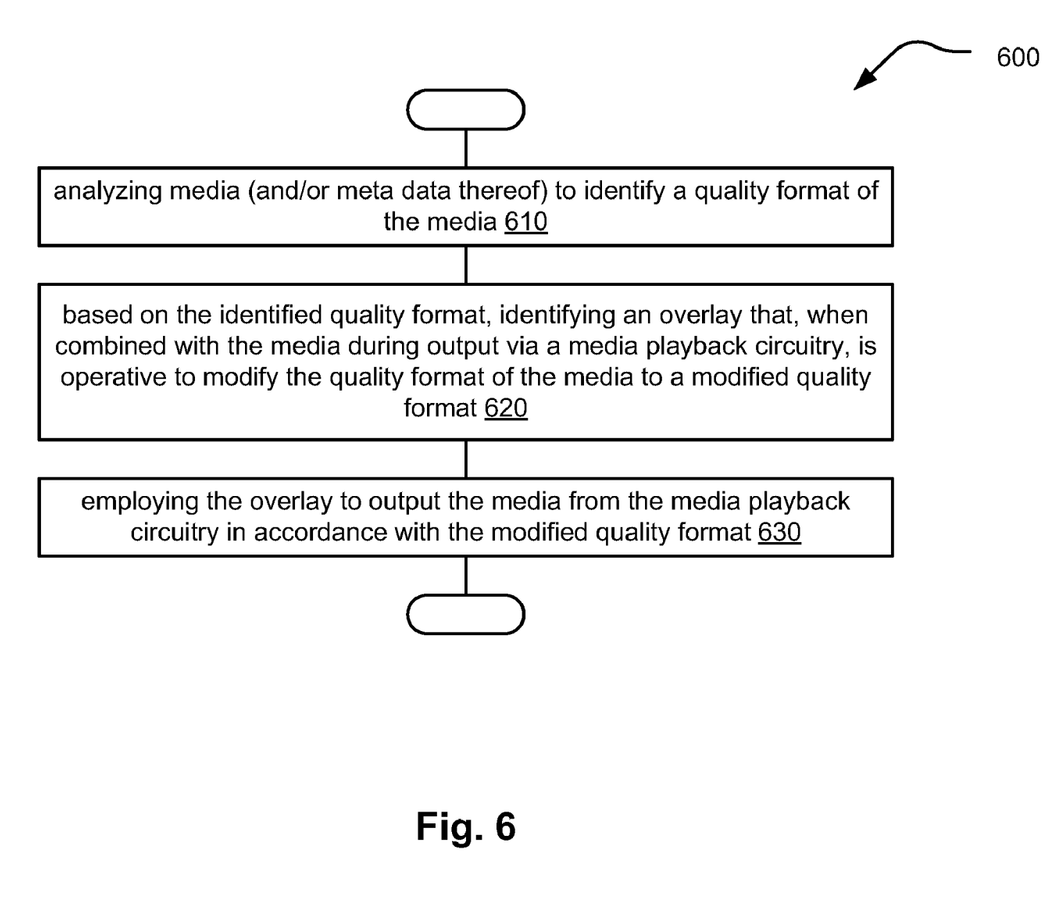
FIG. 6 illustrates an embodiment of a method for employing an overlay to modify a quality format of media that is output.

FIG. 6 illustrates an embodiment of a method 600 for employing an overlay to modify a quality format of media that is output. The method 600 begins by analyzing media (and/or meta data thereof) to identify a quality format of the media, as shown in a block 610. Based on the identified quality format, the method 600 continues by identifying an overlay that, when combined with the media during output via a media playback circuitry, is operative to modify the quality format of the media to a modified quality format, as shown in a block 620. The method 600 proceeds by employing the overlay to output the media from the media playback circuitry in accordance with the modified quality format, as shown in a block 630.

FIGS. 7A, 7B, 8A, 8B, 9A, 9B, 10A, 10B, and 11 illustrate alternative embodiments of methods for employing an overlay to modify a quality format of media that is output.

Figure 7A:
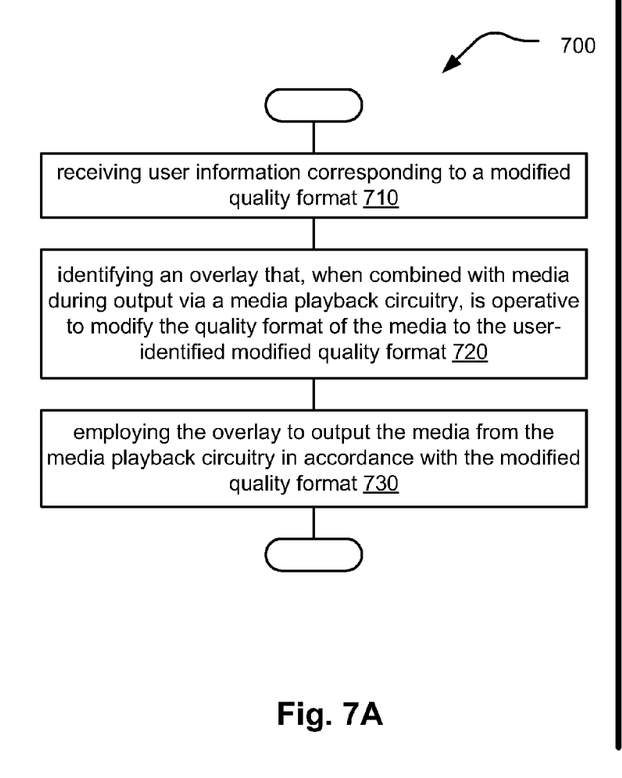
FIGS. 7A, 7B, 8A, 8B, 9A, 9B, 10A, 10B, and 11 illustrate alternative embodiments of methods for employing an overlay to modify a quality format of media that is output.

Referring to method 700 of FIG. 7A, the method 700 begins by receiving user information corresponding to a modified quality format, as shown in a block 710. The method 700 continues by identifying an overlay that, when combined with media during output via a media playback circuitry, is operative to modify the quality format of the media to the user-identified modified quality format, as shown in a block 720. The method 700 then operates by employing the overlay to output the media from the media playback circuitry in accordance with the modified quality format, as shown in a block 730.

Figure 7B:
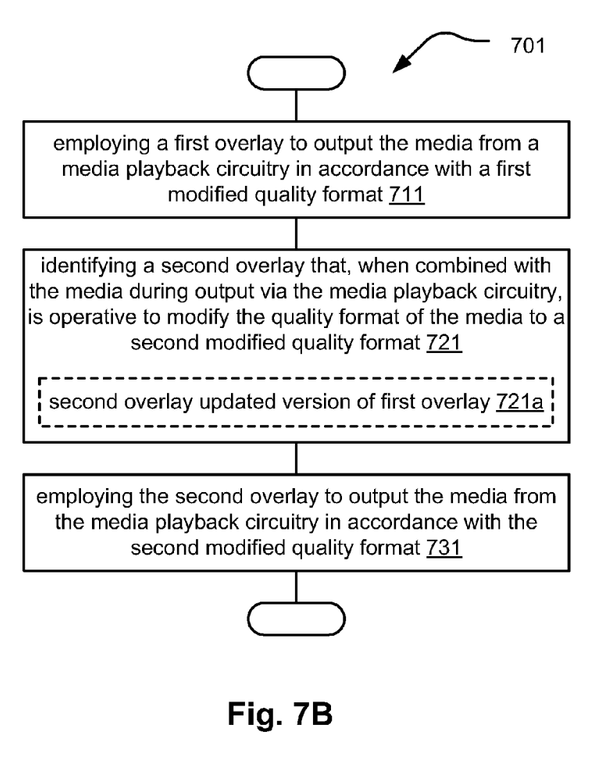

Referring to method 701 of FIG. 7B, the method 701 begins by employing a first overlay to output the media from a media playback circuitry in accordance with a first modified quality format, as shown in a block 711. The method 701 continues by identifying a second overlay that, when combined with the media during output via the media playback circuitry, is operative to modify the quality format of the media to a second modified quality format, as shown in a block 721. In some embodiments, the second overlay is an updated version of the first overlay, as shown in a block 721a. In other words, the first overlay may have been identified in accordance with a first playback of the media, and the second overlay may have been identified in accordance with a second playback of the media. During the difference in time in which the first playback and the second playback took place, there may have been an update to the overlay.

Before or during the second playback, the second overlap is identified and employed to modify the quality format of the media. The method 701 then proceeds by employing the second overlay to output the media from the media playback circuitry in accordance with the second modified quality format, as shown in a block 731.

Figure 8A:
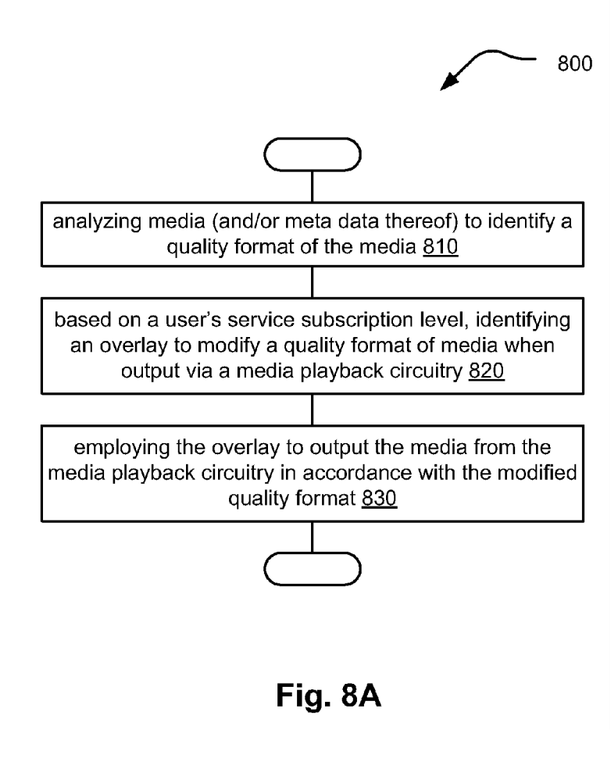

Referring to method 800 of FIG. 8A, the method 800 begins by analyzing media (and/or meta data thereof) to identify a quality format of the media, as shown in a block 810. Based on a user's service subscription level, the method 800 then proceeds by identifying an overlay to modify a quality format of media when output via a media playback circuitry, as shown in a block 820. The method 800 then continues by employing the overlay to output the media from the media playback circuitry in accordance with the modified quality format, as shown in a block 830.

Figure 8B:
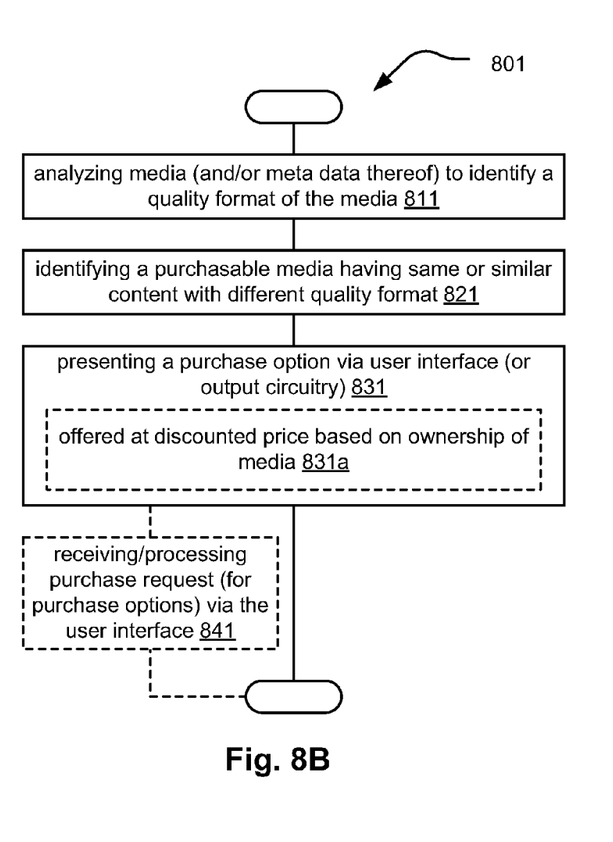

Referring to method 801 of FIG. 8B, the method 801 begins by analyzing media (and/or meta data thereof) to identify a quality format of the media, as shown in a block 811. The method 801 continues by identifying a purchasable media having same or similar content with different quality format, as shown in a block 821. The method 801 continues by presenting a purchase option via user interface (or output circuitry), as shown in a block 831. In some embodiments, the purchase option may be presented or offered at discounted price based on ownership of media, as shown in a block 831a.

Also, in alternative embodiments, the method 801 continues by receiving/processing purchase request (for purchase options) via the user interface, as shown in a block 841.

Figure 9A:
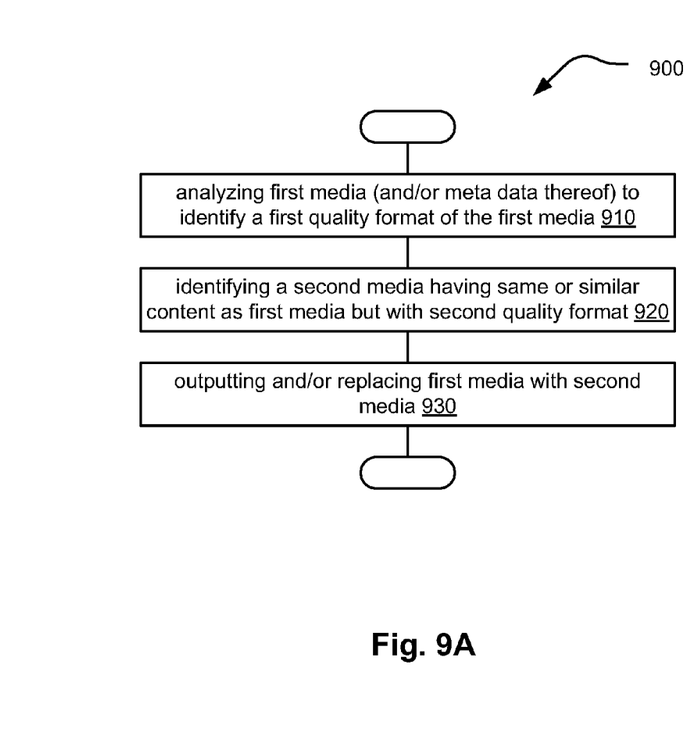

Referring to method 900 of FIG. 9A, the method 900 begins by analyzing first media (and/or meta data thereof) to identify a first quality format of the first media, as shown in a block 910. The method 900 continues by identifying a second media having same or similar content as first media but being encoded or formatted in accordance with a second quality format, as shown in a block 920. The method 900 then proceeds by outputting and/or replacing first media with second media, as shown in a block 930.

Figure 9B:
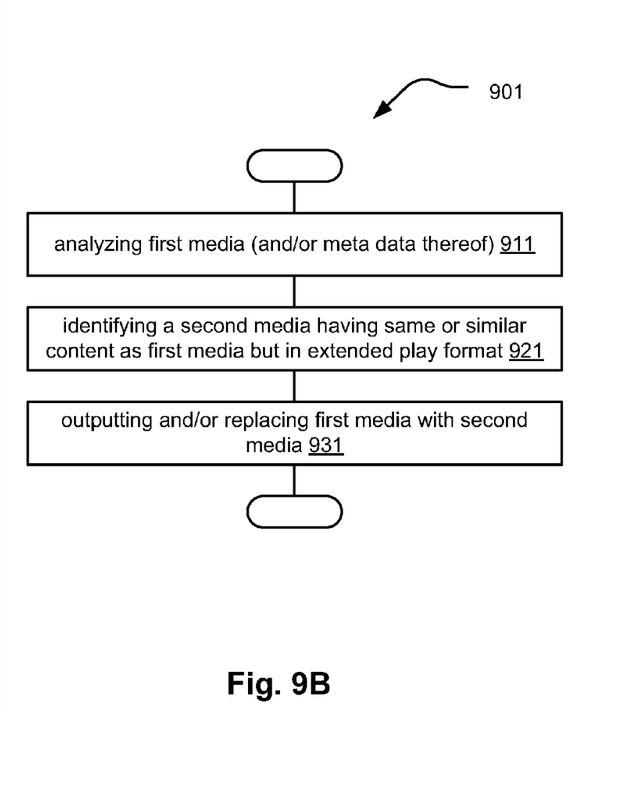

Referring to method 901 of FIG. 9B, the method 901 begins by analyzing first media (and/or meta data thereof), as shown in a block 911. The method 901 then proceeds by identifying a second media having same or similar content as first media but in extended play format, as shown in a block 921. The method 901 operates by outputting and/or replacing first media with second media, as shown in a block 931.

Figure 10A:
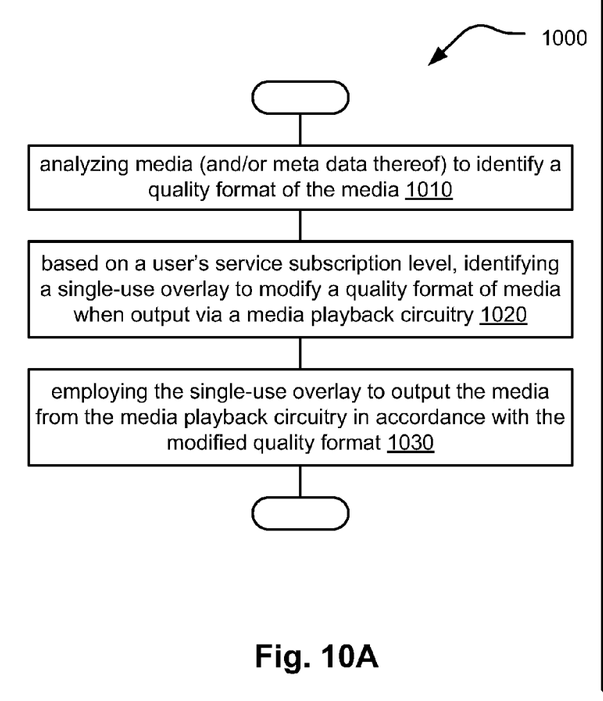

Referring to method 1000 of FIG. 10A, the method 1000 begins by analyzing media (and/or meta data thereof) to identify a quality format of the media, as shown in a block 1010. Based on a user's service subscription level, the method 1000 then proceeds by identifying a single-use overlay to modify a quality format of media when output via a media playback circuitry, as shown in a block 1020. The method 1000 then operates by employing the single-use overlay to output the media from the media playback circuitry in accordance with the modified quality format, as shown in a block 1030.

Figure 10B:
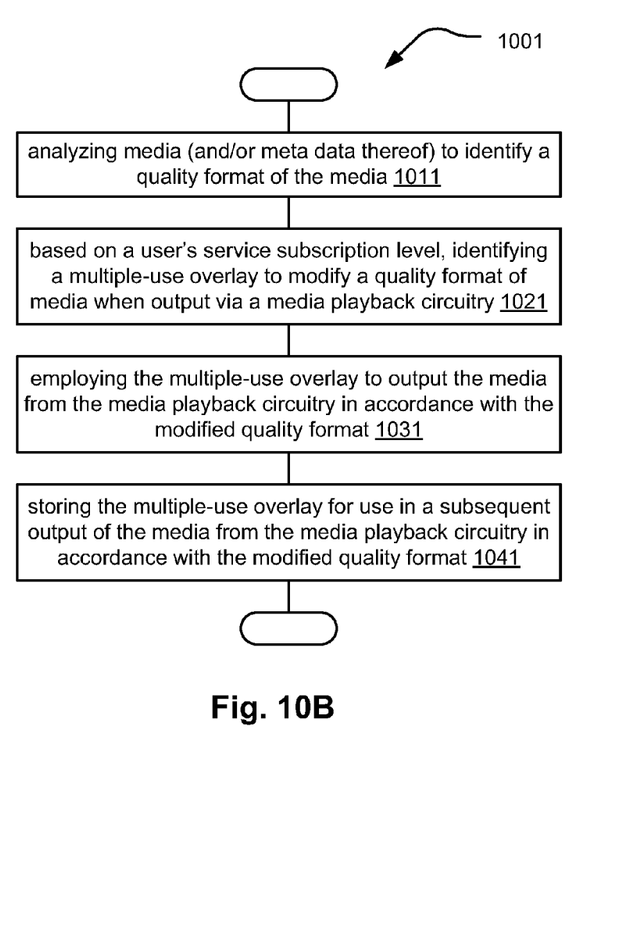

Referring to method 1001 of FIG. 10B, the method 1001 begins by analyzing media (and/or meta data thereof) to identify a quality format of the media, as shown in a block 1011. Based on a user's service subscription level, the method 1001 continues by identifying a multiple-use overlay to modify a quality format of media when output via a media playback circuitry, as shown in a block 1021. The method 1001 continues by employing the multiple-use overlay to output the media from the media playback circuitry in accordance with the modified quality format, as shown in a block 1031. The method 1001 proceeds by storing the multiple-use overlay for use in a subsequent output of the media from the media playback circuitry in accordance with the modified quality format, as shown in a block 1041.

Figure 11:
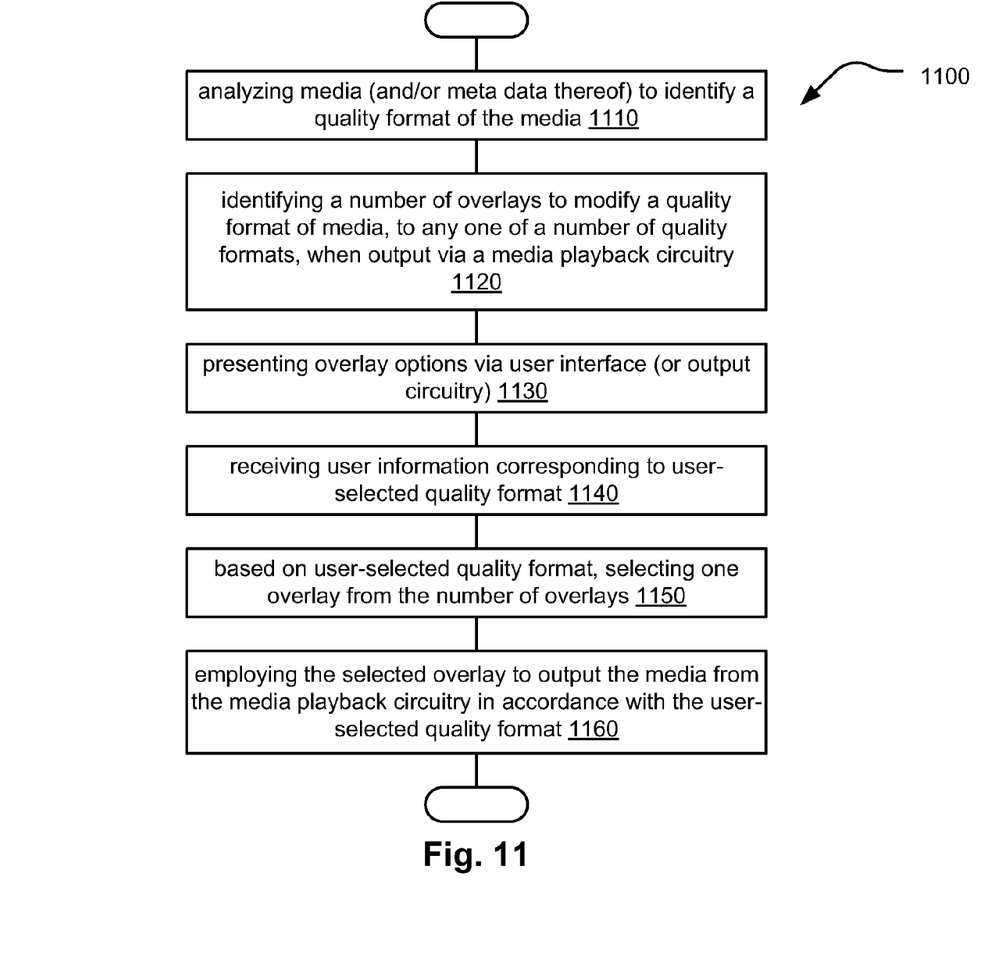

Referring to method 1100 of FIG. 11A, the method 1100 begins by analyzing media (and/or meta data thereof) to identify a quality format of the media, as shown in a block 1110. The method 1100 continues by identifying a number of overlays to modify a quality format of media, to any one of a number of quality formats, when output via a media playback circuitry, as shown in a block 1120.

The method 1100 continues by presenting overlay options via user interface (or output circuitry), as shown in a block 1130. The method 1100 continues by receiving user information corresponding to user-selected quality format, as shown in a block 1140.

Based on user-selected quality format, the method 1100 continues by selecting one overlay from the number of overlays, as shown in a block 1150. The method 1100 continues by employing the selected overlay to output the media from the media playback circuitry in accordance with the user-selected quality format, as shown in a block 1160.

It is noted that the various circuitries and/or modules (e.g., media playback modules or circuitries, overlay modules or circuitries, search modules or circuitries, memory modules or circuitries, processing modules or circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing circuitry implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing circuitry coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
a media playback circuitry;
a overlay circuitry, coupled to the media playback circuitry, that is operative to analyze media to identify a quality format of the media; and
a user interface, coupled to the overlay circuitry, that is operative to receive user information corresponding to a modified quality format; and wherein:
based on the identified quality format and the user information corresponding to the modified quality format, the overlay circuitry is operative to identify an overlay that, when combined with the media during output via the media playback circuitry, is operative to modify the quality format of the media to the modified quality format;
the media playback circuitry employs the overlay to output the media in accordance with the modified quality format; and the modified quality format is relatively higher quality than the quality format.

2. The apparatus of claim 1, further comprising:
a search circuitry, coupled to the overlay circuitry, that is operative to search at least one of a local database and a remote database to identify the overlay; and wherein:
the search circuitry is operative to retrieve the overlay from at least one of a local database and a remote database.

3. The apparatus of claim 1, wherein:
the media includes video media;
the quality format of the video media includes a first video quality;
the modified quality format of the video media includes a second video quality; and
the second video quality is relatively higher quality than the first video quality.

4. The apparatus of claim 1, wherein:
the media includes audio media;
the quality format of the audio media includes a first sound quality;
the modified quality format of the audio media includes a second sound quality; and
the second sound quality is relatively higher quality than the first sound quality.

5. The apparatus of claim 1, wherein:
based on the identified quality format and based on the user information corresponding to the modified quality format, the overlay circuitry is operative to identify the overlay from among a plurality of overlays; and
each of the plurality of overlays, when combined with the media during output via the media playback circuitry, is operative to modify the quality format of the media to a respective quality format.

6. The apparatus of claim 1, further comprising:
a search circuitry, coupled to the user interface, that is operative to identify a purchasable media having the modified quality format based on the user information corresponding to the modified quality format; wherein:
the purchasable media having the modified quality format is presented for purchase via the user interface;
the media includes content encoded with the quality format; and
the purchasable media includes the content encoded with the modified quality format.

7. The apparatus of claim 1, further comprising:
a search circuitry, coupled to the user interface; and wherein:
the user interface is operative to receive user information corresponding to at least one additional quality format;
the search circuitry is operative to identify a purchasable media having the at least one additional quality format based on the user information corresponding to the at least one additional quality format;
the purchasable media having the at least one additional quality format is presented for purchase via the user interface;
the media includes content encoded with the quality format; and
the purchasable media includes the content encoded with the at least one additional quality format.

8. The apparatus of claim 1, further comprising:
a memory circuitry, coupled to the overlay circuitry and the media playback circuitry, that stores the overlay for use by the media playback circuitry in a subsequent output of the media in accordance with modified quality format.

9. The apparatus of claim 1, wherein:

after the media playback circuitry employs the overlay to output the media in accordance with modified quality format, the overlay circuitry is operative to identify at least one additional overlay that, when combined with the media during output via the media playback circuitry, is operative to modify the quality format of the media to at least one additional modified quality format; and the media playback circuitry employs the at least one additional overlay to output the media in accordance with the at least one additional modified quality format.

10. The apparatus of claim 9, wherein:

the at least one additional overlay is an updated version of the overlay; and the at least one additional modified quality format is relatively higher quality than the modified quality format.

11. An apparatus, comprising:

a media playback circuitry; and a overlay circuitry, coupled to the media playback circuitry, that is operative to:

analyze media to identify a quality format of the media; and based on the identified quality format, identify an overlay that, when combined with the media during output via the media playback circuitry, is operative to modify the quality format of the media to a modified quality format; and wherein:

the media playback circuitry employs the overlay to output the media in accordance with the modified quality format.

12. The apparatus of claim 11, further comprising:

a search circuitry, coupled to the overlay circuitry, that is operative to search at least one of a local database and a remote database to identify the overlay; and wherein:

the search circuitry is operative to retrieve the overlay from at least one of a local database and a remote database.

13. The apparatus of claim 11, wherein:

the media includes video media;

the quality format of the video media includes a first video quality;

the modified quality format of the video media includes a second video quality; and the second video quality is relatively higher quality than the first video quality.

14. The apparatus of claim 11, wherein:

the media includes audio media;

the quality format of the audio media includes a first sound quality;

the modified quality format of the audio media includes a second sound quality; and the second sound quality is relatively higher quality than the first sound quality.

15. The apparatus of claim 11, further comprising:

a user interface, coupled to the overlay circuitry, that is operative to receive user information corresponding to the modified quality format; and wherein:

based on the identified quality format and based on the user information corresponding to the modified quality format, the overlay circuitry is operative to identify the overlay from among a plurality of overlays.

16. The apparatus of claim 11, further comprising:

a user interface, coupled to the overlay circuitry, that is operative to receive user information corresponding to the modified quality format; and a search circuitry, coupled to the user interface, that is operative to identify a purchasable media having the modified quality format based on the user information corresponding to the modified quality format; wherein:

the purchasable media having the modified quality format is presented for purchase via the user interface;

the media includes content encoded with the quality format; and the purchasable media includes the content encoded with the modified quality format.

17. The apparatus of claim 11, further comprising:

a user interface, coupled to the overlay circuitry, that is operative to receive user information corresponding to at least one additional quality format; and a search circuitry, coupled to the user interface, that is operative to identify a purchasable media having the at least one additional quality format based on the user information corresponding to the at least one additional quality format; wherein:

the purchasable media having the at least one additional quality format is presented for purchase via the user interface;

the media includes content encoded with the quality format; and the purchasable media includes the content encoded with the at least one additional quality format.

18. The apparatus of claim 11, further comprising:

a memory circuitry, coupled to the overlay circuitry and the media playback circuitry, that stores the overlay for use by the media playback circuitry in a subsequent output of the media in accordance with modified quality format.

19. The apparatus of claim 11, wherein:

after the media playback circuitry employs the overlay to output the media in accordance with modified quality format, the overlay circuitry is operative to identify at least one additional overlay that, when combined with the media during output via the media playback circuitry, is operative to modify the quality format of the media to at least one additional modified quality format; and the media playback circuitry employs the at least one additional overlay to output the media in accordance with the at least one additional modified quality format.

20. The apparatus of claim 19, wherein:

the at least one additional overlay is an updated version of the overlay; and the at least one additional modified quality format is relatively higher quality than the modified quality format.

21. A method, comprising:

analyzing media to identify a quality format of the media;

based on the identified quality format, identifying an overlay that, when combined with the media during output via a media playback circuitry, is operative to modify the quality format of the media to a modified quality format; and employing the overlay to output the media from the media playback circuitry in accordance with the modified quality format.

22. The method of claim 21, further comprising:

searching at least one of a local database and a remote database to identify the overlay.

23. The method of claim 21, wherein:

the media includes video media;

the quality format of the video media includes a first sound quality and a first resolution;

the modified quality format of the video media includes a second sound quality and a second resolution; and the second sound quality is relatively higher quality than the first sound quality; and the second resolution is relatively higher quality than the first resolution.

24. The method of claim 21, wherein:
the media includes audio media;
the quality format of the audio media includes a first sound quality;
the modified quality format of the audio media includes a second sound quality; and
the second sound quality is relatively higher quality than the first sound quality.

25. The method of claim 21, further comprising:
receiving user information corresponding to the modified quality format via a user interface; and
based on the identified quality format and based on the user information corresponding to the modified quality format, identifying the overlay from among a plurality of overlays.

26. The method of claim 21, further comprising:
storing the overlay in a memory circuitry for use by the media playback circuitry in a subsequent output of the media in accordance with modified quality format.

* * * * *